US009497119B2

United States Patent
Basso et al.

(10) Patent No.: US 9,497,119 B2
(45) Date of Patent: Nov. 15, 2016

(54) SUPPORTING ACCESS CONTROL LIST RULES THAT APPLY TO TCP SEGMENTS BELONGING TO 'ESTABLISHED' CONNECTION

(71) Applicant: International Business Machines Corporation, Armonk, NY (US)

(72) Inventors: Claude Basso, Nice (FR); Joseph A. Kirscht, Rochester, MN (US); Natarajan Vaidhyanathan, Carrboro, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 14/284,811

(22) Filed: May 22, 2014

(65) Prior Publication Data

US 2015/0341269 A1 Nov. 26, 2015

(51) Int. Cl.
*H04L 12/743* (2013.01)
*H04L 12/26* (2006.01)
*H04L 12/801* (2013.01)
*H04L 29/06* (2006.01)
*H04L 12/46* (2006.01)

(52) U.S. Cl.
CPC .......... *H04L 45/7457* (2013.01); *H04L 12/26* (2013.01); *H04L 12/4625* (2013.01); *H04L 43/18* (2013.01); *H04L 47/196* (2013.01); *H04L 63/101* (2013.01)

(58) Field of Classification Search
CPC .................................................. H04L 45/7457
See application file for complete search history.

(56) References Cited

U.S. PATENT DOCUMENTS

| | | | |
|---|---|---|---|
| 7,304,996 B1 * | 12/2007 | Swenson | H04L 45/7453 370/229 |
| 7,451,267 B1 | 11/2008 | Venkatachary et al. | |
| 7,552,275 B1 | 6/2009 | Krishnan | |
| 8,358,651 B1 | 1/2013 | Kadosh et al. | |
| 8,553,582 B1 | 10/2013 | Mizrahi et al. | |
| 8,873,392 B1 | 10/2014 | Orr | |
| 2003/0198231 A1 | 10/2003 | Kalkunte et al. | |
| 2005/0114657 A1 * | 5/2005 | Kumar | H04L 63/0245 713/164 |

(Continued)

OTHER PUBLICATIONS

Basso et al., "Supporting Access Control List Rules That Apply to TCP Segments Belonging to 'Established' Connection", U.S. Appl. No. 14/520,076, filed Oct. 21, 2014.

(Continued)

*Primary Examiner* — Albert T Chou
(74) *Attorney, Agent, or Firm* — Patterson + Sheridan, LLP

(57) ABSTRACT

Embodiments presented herein provide a TCAM-based access control list that supports disjunction operations in rules. According to one embodiment, a numeric range table is tied to the access control list. Each entry in the numeric range table includes an encode field that provides for scanning TCP flags in a TCP header of an incoming Ethernet frame. Further, each entry provides a first mask and a second mask used to test for desired set and unset TCP flags in a given frame. Each entry also provides an operation field that performs a disjunction operation that compares the first mask, the second mask, and set TCP flags in a given frame.

13 Claims, 6 Drawing Sheets

(56) References Cited

U.S. PATENT DOCUMENTS

| | | |
|---|---|---|
| 2005/0220092 A1 | 10/2005 | LaVigne et al. |
| 2006/0156018 A1 | 7/2006 | Lauer et al. |
| 2007/0022479 A1* | 1/2007 | Sikdar ............... H04L 63/0218 726/22 |
| 2010/0020814 A1 | 1/2010 | Thyni |
| 2011/0161580 A1 | 6/2011 | Shah et al. |
| 2013/0034100 A1* | 2/2013 | Goyal ...................... G06N 5/02 370/392 |
| 2013/0218853 A1* | 8/2013 | Bullis ................ H04L 41/0816 707/694 |
| 2014/0119177 A1 | 5/2014 | Delregno et al. |
| 2015/0006808 A1* | 1/2015 | Miller .................... G11C 15/00 711/108 |
| 2015/0339240 A1 | 11/2015 | Basso et al. |
| 2015/0341270 A1 | 11/2015 | Basso et al. |
| 2015/0341316 A1 | 11/2015 | Basso et al. |
| 2015/0341364 A1 | 11/2015 | Basso et al. |
| 2015/0341365 A1 | 11/2015 | Basso et al. |
| 2015/0358244 A1 | 12/2015 | Basso et al. |
| 2015/0358245 A1 | 12/2015 | Basso et al. |

OTHER PUBLICATIONS

U.S. Appl. No. 14/284,859, entitled "Access Control List-Based Port Mirroring Techniques", filed May 22, 2014.

U.S. Appl. No. 14/284,927, entitled "Skipping and Parsing Internet Protocol Version 6 Extension Headers to Reach Upper Layer Headers", filed May 22, 2014.

U.S. Appl. No. 14/284,788, entitled "Atomically Updating Ternary Content Addressable Memory-Based Access Control Lists", filed May 22, 2014.

U.S. Appl. No. 14/296,574, entitled "Unified Framework for Isolating Multicast and Broadcast Frames to a Traffic Class Separate From a Traffic Class Used for Unicast Frames", filed Jun. 5, 2014.

* cited by examiner

| Numeric Range Table Entry Layout |||
|---|---|---|
| Field | Length | Description |
| Inner Field Select | 1 | Field Encode Inner/Outer Select<br>1 (1): The Field Encode of this register refers to fields from inner header in an overlay frame<br>0 (0): The Field Encode of this register refers to fields from outer header in an overlay frame |
| Encode | 3 | 0 (000): SP (Uses bits 15:0 of Mask fields)<br>1 (001): DP (Uses bits 15:0 of Mask fields)<br>2 (010): VLAN Id (Uses bits 11:0 of Mask fields)<br>3 (011): TTL (Uses bits 7:0 of Mask fields)<br>4 (100): L3 Proto (Uses bits 7:0 of Mask fields)<br>5 (101): EtherType (Uses bits 15:0 of Mask fields)<br>6 (110): L3 Payload Length (Uses bits 6:0 of Mask fields)<br>7 (111): TCP Flags (Uses bits 7:0 of Mask fields) |
| Value1 | 16 | Mask field |
| Value2 | 16 | Mask field |
| Operation | 2 | 0 (00): Value1 <= val <= Value2<br>1 (01): (val == Value1) OR (val == Value2)<br>2 (10): (val != Value1) AND (val != Value2)<br>3 (11): (Value1 AND ~val) OR (Value2 AND val) != 0 |

| TCP Flags | | |
|---|---|---|
| 7:0 | CWR | Congestion Window Reduced |
| 8:0 | ECE | ECN-Echo |
| 9:0 | URG | Urgent |
| 10:0 | ACK | Acknowledgment |
| 11:0 | PSH | Push |
| 12:0 | RST | Reset |
| 13:0 | SYN | Synchronize |
| 14:0 | FIN | Finished |

FIGURE 4

SUPPORTING ACCESS CONTROL LIST RULES THAT APPLY TO TCP SEGMENTS BELONGING TO 'ESTABLISHED' CONNECTION

BACKGROUND

In computer networking, an access control list (ACL) can refer to a strictly ordered list of rules applied to port numbers or IP addresses available on a host or other network. An ACL may be implemented on networking devices, such as routers and switches, to filter traffic and provide network security. For instance, an ACL may include rules that specify certain network hosts or addresses that a switch should permit or deny network access.

An ACL rule may be divided into a condition and an action. That is, if a certain condition is satisfied, then the networking device performs the corresponding action. For example, a rule may specify, as a condition, receiving an incoming frame from a specific IP address. The rule could specify, as a corresponding action, to discard the frame. Typically, networking devices configured with ACLs execute an action associated with the first matching rule in the list. Therefore, the ordering of the list is of importance.

Further, An ACL may be implemented in a networking device using ternary content addressable memory (TCAM). TCAM is a type of computer memory that allows for high speed searching in the ACL. However, TCAM capacity is costly, and thus, an ACL is generally restricted by spatial considerations. To maximize usage in the ACL, the TCAM allows rule conditions to be grouped together conjunctively. More specifically, different rule conditions may be tied together by using logical AND operations. As a result, numerous conditions may be expressed in one rule for efficiency.

Additionally, a networking device may provide a numeric range table that aids the device in performing numeric comparisons for TCAM-based rules. When the networking device receives an incoming Ethernet frame, the device consults the numeric range table prior to searching for a matching rule condition in the ACL. If the networking device matches a given entry of the numeric range table, the networking device may generate a portion of a search key from values obtained from the entry and use the search key to access the TCAM.

SUMMARY

Embodiments presented herein include a method for configuring a numeric range table to allow a ternary content addressable memory (TCAM) to perform disjunctive tests in an access control list. The method generally includes setting, in a first entry in the numeric range table: (i) an encode field of an first entry in a numeric range table to scan a TCP header of an incoming Ethernet frame for set TCP flags; (ii) a first mask field of the first entry to a condition corresponding to unset TCP flags to identify in the frame; (iii) a second mask field of the first entry to a condition corresponding to set TCP flags to identify in the frame; and (iv) an operation field of the first entry to perform a disjunction operation. The disjunction operation compares the set TCP flags of the frame with the first mask field and the second mask field.

BRIEF DESCRIPTION OF THE SEVERAL VIEWS OF THE DRAWINGS

FIG. 4 illustrates a layout for an entry of a numeric range table that allows an access control list stored in a ternary content addressable memory (TCAM) to support disjunction operations, according to one embodiment.

DETAILED DESCRIPTION

Figure 1:
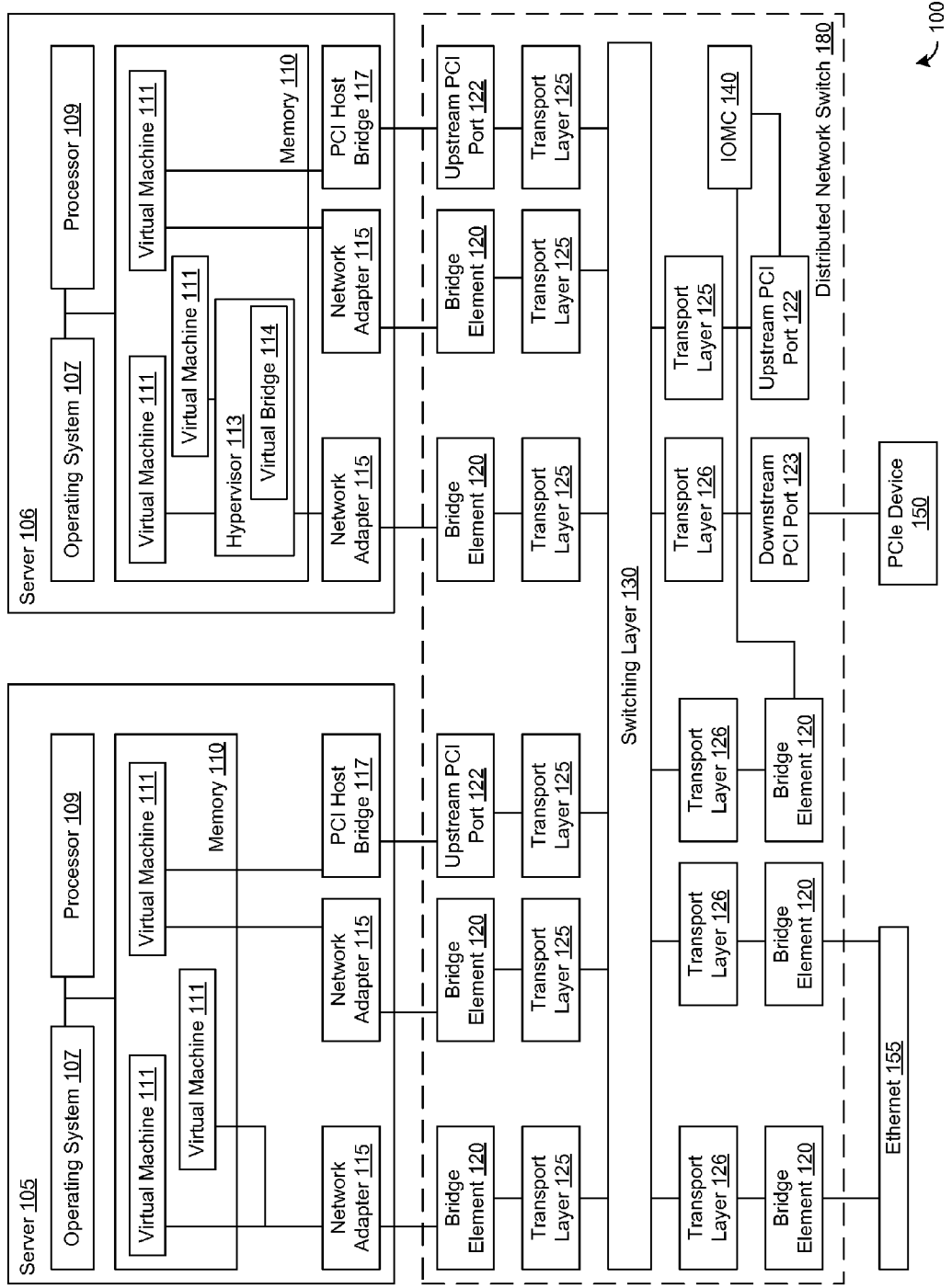
FIG. 1 illustrates a system architecture that includes a distributed network switch, according to one embodiment.

One drawback of implementing an access control list (ACL) using a ternary content addressable memory (TCAM) is that although rule conditions may be expressed using logical conjunction (i.e., through logical AND operations), TCAMs generally do not support conditions expressed using logical disjunction (i.e., through logical OR operations). For example, consider creating an ACL rule that identifies Transmission Control Protocol (TCP) segments associated with established connections. To do so, an ACL rule should account for frames that include either an ACK (acknowledge) or RST (reset) flag set in a TCP header of the frame. However, because the TCAM does not support logical disjunction, two rules are necessary to adequately cover such a case: one rule to identify frames with an ACK flag set and another rule to identify frames with a RST flag set. Because the TCAM does not provide support for disjunctive conditions, it is possible that many rules in the TCAM that can otherwise be expressed in disjunctive form are expressed as separate conditions. This results in numerous rules in a TCAM, which may lead to resource exhaustion.

Embodiments presented herein describe techniques for matching Ethernet frames having set TCP flags to rules in an ACL. More specifically, the techniques provide a modified numeric range table that allows the ACL conditions to be expressed disjunctively. In one embodiment, a numeric range table uses an encode field in an entry to identify whether an incoming frame has TCP flags set in a header. Further, the numeric range table provides an additional comparison operation that allows disjunctive expressions to be created.

As a result, when a switch (or other networking device) receives an incoming frame, the switch determines whether any TCP flags set in the TCP header of the frame match any entry containing such disjunctive conditions in the numeric range table. If such a match exists, the numeric range table provides the switch with values associated with the entry. The switch uses the values to generate a portion of a search key to access a corresponding entry in the access control list stored in the TCAM.

The techniques described herein allow a TCAM-based ACL to support logical disjunction operations in matching TCP packets having flags set in arbitrary positive and negative positions. Advantageously, the ACL is capable of storing numerous conditions that may be expressed disjunctively in a single rule. Doing so allows space in a TCAM to be used more efficiently in a network switch. Further, by implementing the techniques in a numeric range table separate from the TCAM, the TCAM itself is not modified to support disjunctive operations.

Note, the following description relies on a distributed network switch as a reference example of a networking device that uses an access control list stored in a TCAM table. However, one of skill in the art will recognize that techniques are applicable in other contexts related to supporting disjunctive expressions. Because the TCAM typically does not support logical OR operations, techniques disclosed herein may be adapted to other devices that maintain an access control list in TCAM. Further, the following description uses a static random-access memory (SRAM) table as a reference example for a structure that stores corresponding actions of a TCAM-based access control list. However, any addressable array structure (e.g., a Register Array, Register, File, an EDRAM, and the like) may be used to store such actions.

FIG. 1 illustrates a system architecture 100 that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

Further, in one embodiment, the bridge elements 120 include a ternary content addressable memory (TCAM) table and a static random-access memory (SRAM) table which collectively provide an access control list (ACL). The ACL maintains a list of rules that the bridge elements 120 apply in managing data frames processed within the distributed network switch 180. The TCAM table stores a condition for each rule. And the SRAM stores an action performed when a corresponding rule condition is met.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

Figure 2:
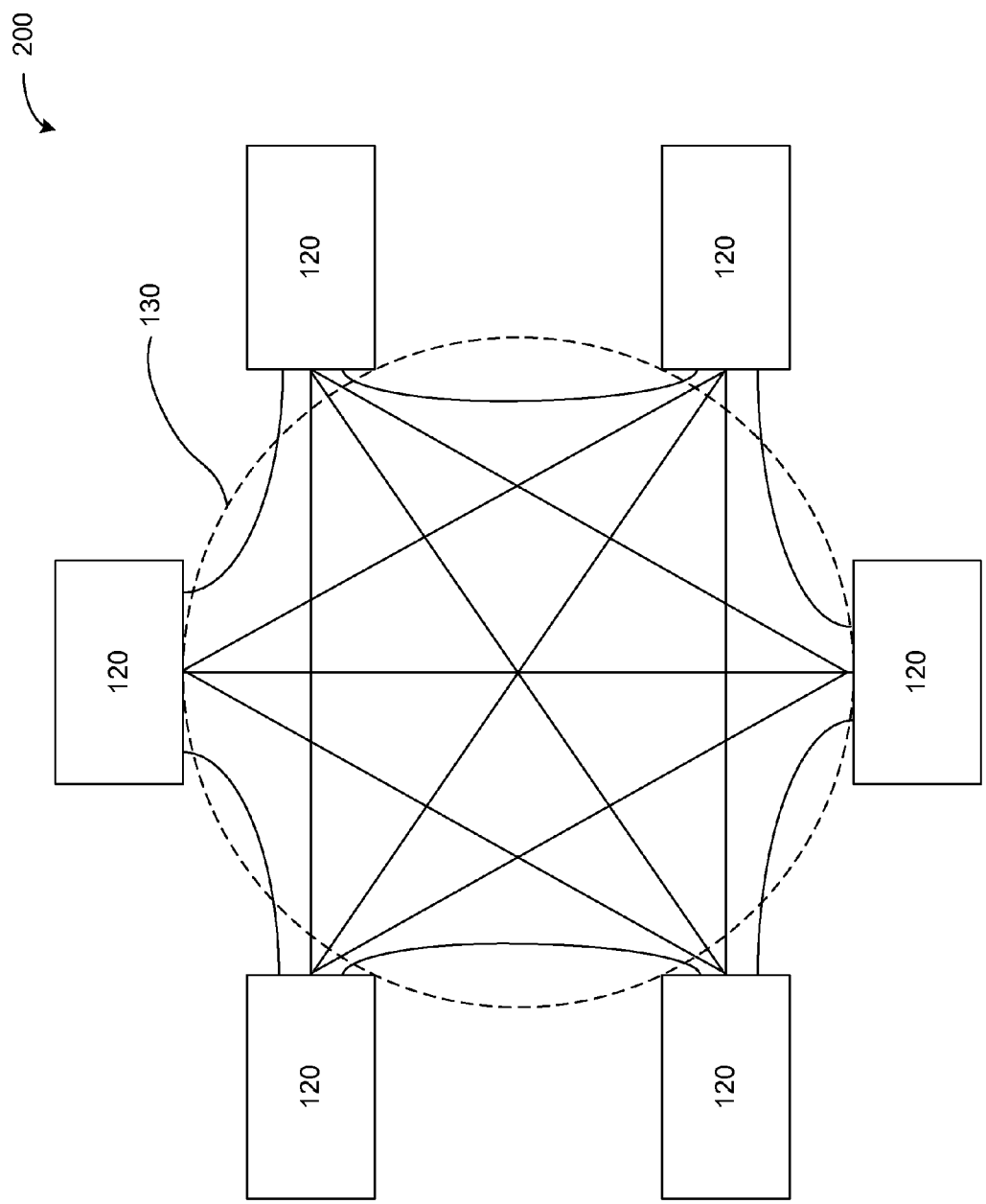
FIG. 2 illustrates components of a distributed network switch, according to one embodiment.

FIG. 2 illustrates a virtual switching layer, according to one embodiment. Each bridging element 120 in the system 100 is connected to each other using the switching layer 130 via a mesh connection schema. That is, no matter the bridging element 120 used, a cell (i.e., data packet) can be routed to another bridging element 120 located on any other switch module. This may be accomplished by directly connecting each bridging element 120—i.e., each bridging element 120 has a dedicated data path to every other bridging element 120.

In one embodiment, each switch module is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 3:
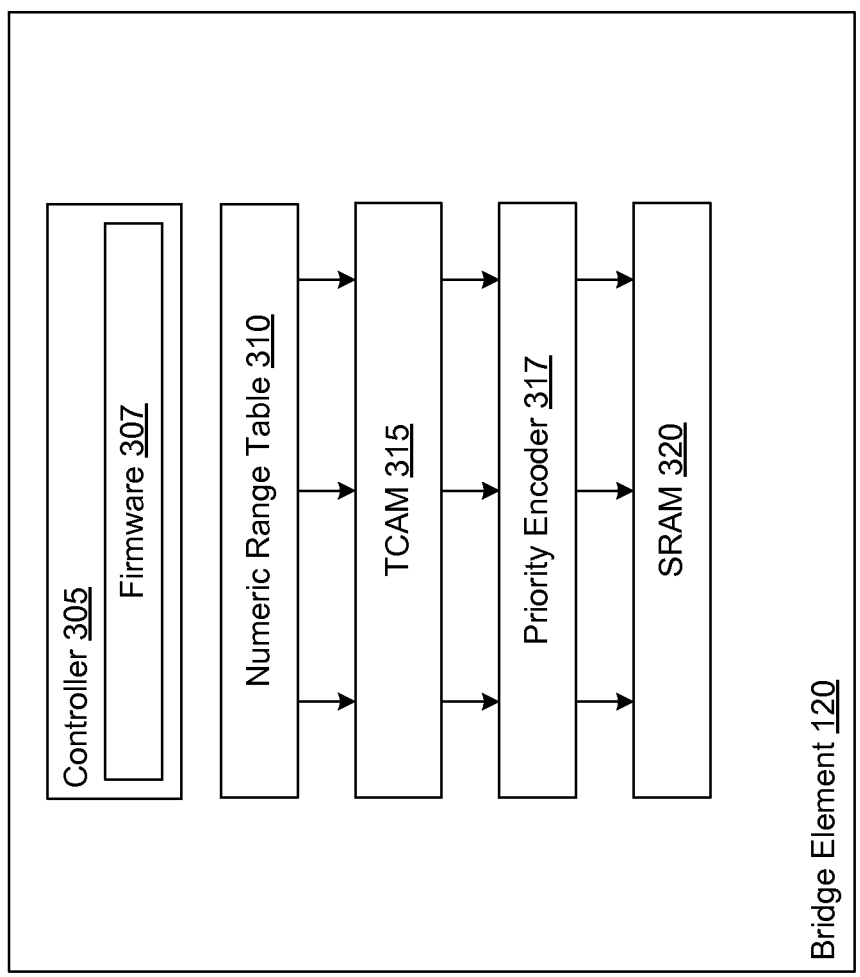
FIG. 3 illustrates a bridge element configured with a numeric range table that allows a ternary content addressable memory (TCAM)-based access control list to support disjunction operations, according to one embodiment.

In one embodiment, each individual bridge element 120 manages its own ACL using a TCAM and an SRAM residing within the bridge element 120. An example bridge element 120 is further shown in FIG. 3. More specifically, FIG. 3 illustrates a bridge element 120 configured to process Ethernet frames having set TCP flags, according to one embodiment. As shown, the bridge element 120 includes a controller 305, a numeric range table 310, a TCAM 315, a priority encoder 317, and an SRAM 320. The controller 305 includes firmware 307. The firmware 307 provides various modules for managing aspects of the bridge element 120, such as ACLs maintained in the bridge element 120.

The TCAM 315 stores rule conditions for the ACL based on rule priority. Each entry in the table provides a condition. An encoded value of a TCAM row having the highest priority that matches the search criteria used to determine the location of the corresponding rule action stored in the SRAM 320. When the bridge element 120 receives an incoming frame, the controller 305 iterates through the ACL, beginning from the highest priority (and active) rule to determine if any condition matches the frame. For example, the rule may match various properties to an incoming frame, such as a service IP address, a source/destination IP address, and the like. The TCAM 315 outputs a bit vector that is equal in length to the number of rows in the TCAM 315. When properties of a frame match one or more of the conditions in the TCAM 315, the corresponding positions within the output bit vector of the TCAM 315 are active. The output bit vector from the TCAM 315 is then applied as input to the priority encoder 317. In turn, the priority encoder 317 determines whether there are any active bits. If so, the priority encoder 317 encodes the bit position of the highest priority into an address and applies the output to the SRAM 320 to retrieve the corresponding action.

The numeric range table 315 allows the controller 305 to perform fast lookup and comparison operations between parameters of the frame and entries in the TCAM 315. The numeric range table 315 provides portions of a search key used by the controller 305 to access the TCAM 315. In one embodiment, the numeric range table 315 allows common conditions to be grouped into one rule based on encode and operation fields provided in a table entry.

FIG. 4 illustrates a layout 400 of the numeric range table 315, according to one embodiment. Illustratively, an entry in the numeric range table includes an inner field select, an encode field, a Value1 field, a Value2 field, and an operation field. As shown, the layout 400 provides a length and description for each field. The inner field select indicates whether a field encoding refers to fields from an inner or an outer header. According to the description, an inner field select value of 1 in an incoming frame indicates that a field encode refers to fields from an inner header in an overlay frame, while a value of 0 indicates that the field encode refers to fields from an outer header in the overlay frame.

The encode field 410 of a numeric range table entry indicates a type of encode to be identified in an evaluated Ethernet frame. Further, a numeric range table entry with an encode field 410 value of 7 (b111) indicates to the bridge element 120 to identify TCP flags of a frame. The TCP flags table 430 provides an expanded view of each TCP flag and its corresponding bit position in a TCP header.

An entry in the numeric range table 315 provides two 16-bit masks fields (i.e., Value1 415 and Value2 420) that allow for use for various functions. In one embodiment, Value1 415 and Value2 420 may be used to evaluate TCP flags using 8 of the bits of each mask field. More specifically, Value1 415 may be used to identify unset flags as specified by a particular ACL condition. Further, Value2 420 may be used to identify set flags as specified in the ACL condition. For example, assume a given ACL condition tests for either an unset RST flag or a set SYN flag (i.e., ~RST OR SYN). In such a case, in Value1, the bit corresponding to RST is set to 1 and the bit corresponding to SYN is set to 0 (i.e., bits 7:0 of Value1=b00000100). Further, in Value2, the bit corresponding to RST is set to 0 and the bit corresponding to SYN is set to 1 (i.e., bits 7:0 of Value2=b00000010).

The operation field 425 of a numeric range table entry specifies a comparison operation between a value (labeled as "val" in layout 400) obtained from a frame and Value1 415 and Value2 420. In one embodiment, a numeric range table entry with an operation field 425 value of 3 indicates to the bridge element 120 to perform the following comparison:

$$(\text{Value1 AND} \sim\text{val}) \text{OR} (\text{Value2 AND val}) \neq 0 \qquad (1)$$

The above operation (also indicated in the dotted box 427) includes two conditions that use bitwise AND operations to evaluate val and determine whether any of the conditions specified in Value1 415 or Value2 420 are present.

Continuing the previous example, assume that the bridge element 120 receives a frame with only SYN and FIN TCP flags set (i.e., val=b00000011). To test val for the condition ~RST OR SYN previously stated, the bridge element 120 evaluates (1) as follows:

(b00000100 AND b00000100)OR(b00000010 AND b00000011)=1

Although it is sufficient for a single AND term to evaluate to True, both AND terms above evaluate to True, and thus, the frame described above satisfies the ~RST OR SYN expression. As another example, consider a frame with only a RST TCP flag set (i.e., val=b00000100). Accordingly, (1) is as follows:

(b00000100 AND b00000011)OR(b00000010 AND b00000100)=0

Because both AND conditions in the left part of the expression result in 0, the frame does not satisfy the ~RST OR SYN expression.

When the properties of an inbound frame match the constraints defined by a numeric range table entry, a bit within the search key corresponding to the matching numeric range table entry is activated. The modified search key is applied as input to the TCAM 315 to perform search operation to identify rule entries that match the key.

Figure 5:
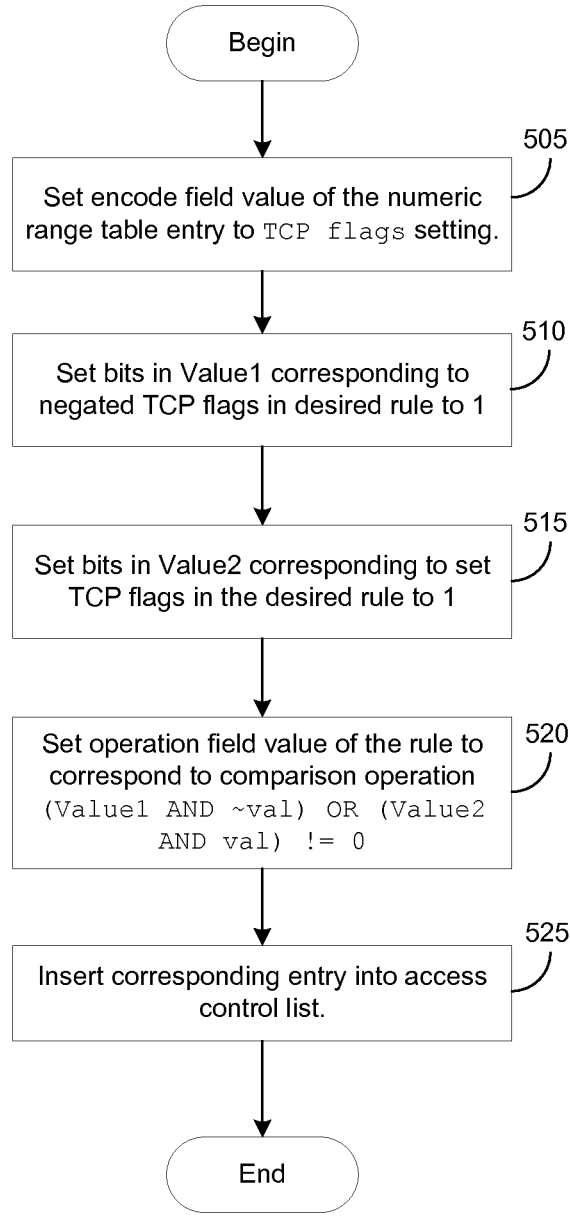
FIG. 5 illustrates a method for creating an entry in a numeric range table that allows a TCAM-based access control list to support disjunction operations, according to one embodiment.

FIG. 5 illustrates a method 500 for creating an entry in the numeric range table 315 to test disjunctive conditions, according to one embodiment. Assume that desired conditions are provided to the bridge element 120. Further, assume the desired conditions test for TCP segments of an established connection. More specifically, the expression should ensure that either the ACK or RST flag is set in a TCP header of a given frame.

Method 500 begins at step 505, where the firmware 307 sets the encode field value of the entry to the TCP flags setting. According to the layout 400, the encode field value is set to 7.

At step 510, the firmware 307 sets bits in Value1 that correspond to any negated TCP flags in the desired rule to 1. In this case, Value1 is set to b00000000 because the desired rule is does not test for negated flags. At step 515, the firmware 307 sets bits in Value2 that correspond to any set TCP flags in the desired rule to 1. In this case, Value2 is set to b00010100, where the set bits correspond to the RST and ACK flags.

At step 520, the firmware 307 sets the operation field value of the rule to correspond to the comparison expression (1), described above. Doing so ensures that when the bridge element 120 receives a frame, its TCP flags will be evaluated using the expression provided by the numeric range table entry. After the entry is configured, the firmware 307 inserts an entry into the TCAM 315 linking from the numeric range table entry. Further, the firmware 307 stores a corresponding rule action in the SRAM 320.

Figure 6:
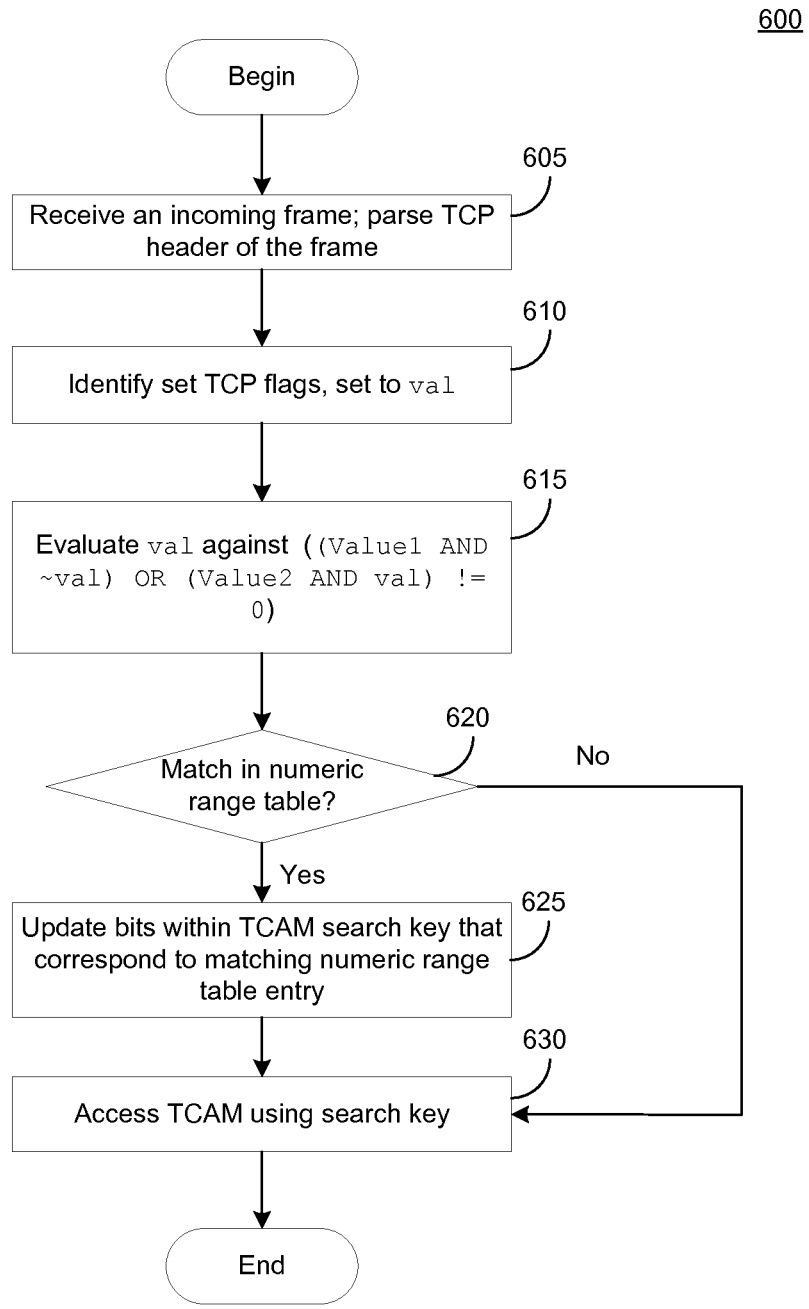
FIG. 6 illustrates a method for matching an entry in a numeric range table that allows a TCAM-based access control list to support disjunction operations, according to one embodiment.

FIG. 6 illustrates a method 600 for matching an entry in the numeric range table 315, according to one embodiment. Assume that the ACL rule corresponds to the example rule that tests for either a set RST or ACK flag. Method 600 begins at step 605, where the bridge element 120 receives an incoming frame. The controller 305 parses the TCP header of the frame. At step 610, the controller 305 identifies TCP flags set in the header. As an example, assume the set TCP flags are ACK and SYN. Further, the controller 305 sets val to b00010010.

At step 615, the controller 305 evaluates val using the expression provided by the entry in the numeric range table. In this case, the controller 305 evaluates the expression as follows:

$$(\text{Value1 AND } \sim\text{val})\text{OR}(\text{Value2 AND val})!=0$$

$$(b00000000 \text{ AND } \sim b00001101)\text{OR}(b00010100 \text{ AND } b00010010)!=0$$

$$b00000000 \text{ OR } b00010000!=0$$

$$b0 \text{ OR } b1!=0$$

At step 620, the controller 305 determines whether the evaluation results in a match. As demonstrated, the operation results in a match. If a match exists between the frame and the entry, then at step 625, the controller 305 generates a portion of a TCAM search key using bits generated from the numeric range table. Once fully generated, the key is used to access the TCAM 315 to obtain an address for the corresponding rule action in the SRAM 320 (at step 630).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a processor, and
a memory storing a program, which, when executed on the processor, performs an operation for configuring a numeric range table to allow a ternary content addressable memory (TCAM) to perform disjunctive tests in an access control list, the operation comprising:
setting, in a first entry in the numeric range table:
an encode field of an first entry in a numeric range table to scan a TCP header of an incoming Ethernet frame for set TCP flags,
a first mask field of the first entry to a condition corresponding to unset TCP flags to identify in the frame,
a second mask field of the first entry to a condition corresponding to set TCP flags to identify in the frame, and
an operation field of the first entry to perform a disjunction operation, wherein the disjunction operation compares the set TCP flags of the frame with the first mask field and the second mask field.

2. The system of claim 1, wherein the operation further comprises, inserting a second entry associated with the first entry into the TCAM, wherein the second entry provides an address to a block in a static random access memory table.

3. The system of claim 1, wherein the operation further comprises, accessing the TCAM using the search key.

4. The system of claim 1, wherein the operation further comprises:
receiving a network frame;
determining set TCP flags of the received frame;
upon determining the set TCP flags match the first entry, updating bits of a search key that correspond to the first entry, wherein the search key accesses the second entry stored in the TCAM.

5. The system of claim 1, wherein the disjunction operation is (Value1 AND ~val)OR(Value1 AND val)≠0, wherein Value1 is a value of the first mask field, wherein Value1 is a value of the second mask field, and wherein val is a value representing set TCP flags in a TCP header of the incoming frame.

6. The system of claim 1, wherein the access control list specifies conditions for processing a frame according to a rule and actions for managing incoming network frames in a distributed network switch.

7. A computer program product, comprising:
A non-transitory computer-readable storage medium having computer-readable program code embodied therewith, the computer-readable program code configured to perform an operation for configuring a numeric range table to allow a ternary content addressable memory (TCAM) to perform disjunctive tests in an access control list, the operation comprising:
setting, in a first entry in the numeric range table:
an encode field of an first entry in a numeric range table to scan a TCP header of an incoming Ethernet frame for set TCP flags,
a first mask field of the first entry to a condition corresponding to unset TCP flags to identify in the frame,
a second mask field of the first entry to a condition corresponding to set TCP flags to identify in the frame, and
an operation field of the first entry to perform a disjunction operation, wherein the disjunction operation compares the set TCP flags of the frame with the first mask field and the second mask field.

8. The computer program product of claim 7, wherein the operation further comprises, inserting a second entry associated with the first entry into the TCAM, wherein the second entry provides an address to a block in a static random access memory table.

9. The computer program product of claim 8, wherein the block contains an action to perform on an Ethernet frame that satisfies the disjunction operation.

10. The computer program product of claim 8, further comprising, accessing the TCAM using the search key.

11. The computer program product of claim 7, wherein the operation further comprises:
receiving a network frame;
determining set TCP flags of the received frame;
upon determining the set TCP flags match the first entry, updating bits of a search key that correspond to the first entry, wherein the search key accesses the second entry stored in the TCAM.

12. The computer program product of claim 7, wherein the disjunction operation is (Value1 AND ~val)OR(Value1 AND val)≠0, wherein Value1 is a value of the first mask field, wherein Value1 is a value of the second mask field, and wherein val is a value representing set TCP flags in a TCP header of the incoming frame.

13. The computer program product of claim 7, wherein the access control list specifies conditions for processing a frame according to a rule and actions for managing incoming network frames in a distributed network switch.

* * * * *